United States Patent [19]

Dickopp et al.

[11] Patent Number: 5,179,623
[45] Date of Patent: Jan. 12, 1993

[54] METHOD FOR TRANSMITTING AN AUDIO SIGNAL WITH AN IMPROVED SIGNAL TO NOISE RATIO

[75] Inventors: Gerhard Dickopp, Krefeld-Bockum; Detlef Krahe, Kempen; Thomas Vaupel, Essen, all of Fed. Rep. of Germany

[73] Assignee: TELEFUNKEN Fernseh und Rundfunk GmbH, Hanover, Fed. Rep. of Germany

[21] Appl. No.: 498,753

[22] PCT Filed: May 24, 1989

[86] PCT No.: PCT/EP89/00568
§ 371 Date: Mar. 25, 1991
§ 102(e) Date: Mar. 25, 1991

[87] PCT Pub. No.: WO89/11759
PCT Pub. Date: Nov. 30, 1989

[30] Foreign Application Priority Data

May 26, 1988 [DE] Fed. Rep. of Germany ....... 3817788
May 26, 1988 [DE] Fed. Rep. of Germany ....... 3817789
May 26, 1988 [DE] Fed. Rep. of Germany ....... 3817864

[51] Int. Cl.$^5$ .................................................. G10L 9/14
[52] U.S. Cl. ............................................................ 395/2
[58] Field of Search ................................. 381/29–40, 381/47, 49; 370/81; 379/339; 364/726; 395/2

[56] References Cited

U.S. PATENT DOCUMENTS 3,238,298 3/1966 Willis ................................... 381/29
4,045,616 8/1977 Sloane ................................. 381/37
4,388,491 6/1983 Ohta et al. ........................... 381/49
4,747,143 5/1988 Kroeger et al. ..................... 381/47
4,759,071 7/1988 Heide .................................. 381/47
4,942,607 7/1990 Schroder ............................. 381/35

FOREIGN PATENT DOCUMENTS 0193143 9/1986 European Pat. Off. .
0251028 1/1988 European Pat. Off. .
2908321 9/1980 Fed. Rep. of Germany .
3310480C2 10/1984 Fed. Rep. of Germany .
8603873 7/1986 PCT Int'l Appl. .

Primary Examiner—Michael R. Fleming
Assistant Examiner—Michelle Doerrler
Attorney, Agent, or Firm—Spencer, Frank & Schneider

[57] ABSTRACT

A method of transmitting an audio signal wherein the audio signal is partitioned into successive (in time) blocks by means of time windows, the signal parts contained in the blocks are converted to short-time frequency spectrums by transformation, subsequently the short-time frequency spectrums are coded on the basis of psycho-acoustical masking laws and are transmitted. The received coded signals are decoded, the short-time frequency spectrum signals are brought back into the time domain through re-transformation, and finally the blocks present in the time domain are assembled. Moreover, the blocks are partitioned into sub-blocks and, in case of signal level changes from one block to the other which exceed a predetermined value, the signal parts in the sub-blocks are subjected to a compression prior to transformation and to a complementary expansion after the re-transformation. To improve the signal-to-noise ratio, the signal is amplified and/or attenuated in the sub-blocks during the compression dependent on the average signal powers in the respective sub-blocks.

23 Claims, 8 Drawing Sheets

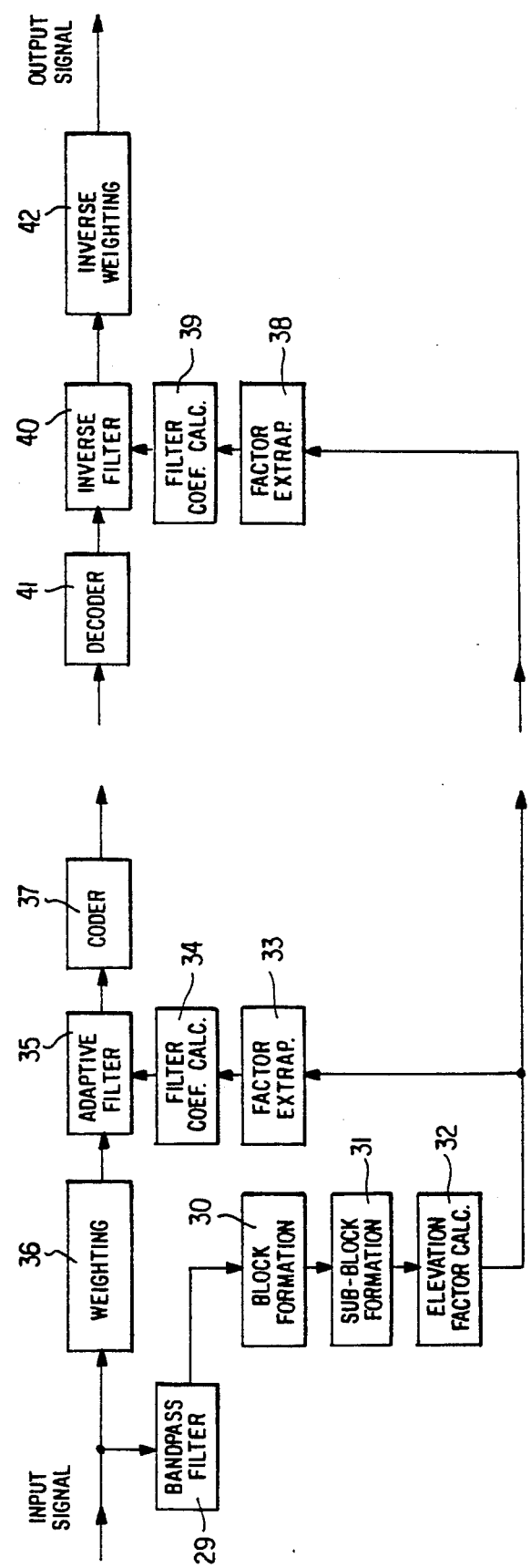

METHOD FOR TRANSMITTING AN AUDIO SIGNAL WITH AN IMPROVED SIGNAL TO NOISE RATIO

BACKGROUND OF THE INVENTION

In the transmission of an audio signal, for example in radio transmission, cable transmission, satellite transmission and in recording devices, it is known to convert the analog audio signal to a digital audio signal with a certain resolution (definition), to transmit it in this form, and to re-convert it into an analog signal for reproduction. By means of the digital transmission, in particular, a better signal-to-noise ratio in reproduction is achieved.

The band width required for transmission of such a signal is mainly determined by the number of sampling values to be transmitted per time unit as well as by the resolution.

In practice, the objective is to keep the band width required for transmission as small as possible in order to be able to use a narrow band cable or to transmit as many audio signals as possible via an existing channel at the same time. The required band width can be reduced as such through a reduction of sampling values or the number of bits per sampling value.

These measures usually cause deterioration in reproduction, however. In a known method (DE OS 35 06 912.0) for enhancement of reproduction quality, the digital audio signal is transformed in successive (in time) partitions or sections into a short-time spectrum which represents the spectral components of the signal for the respective time intervals, e.g. 20 ms. In the short-time spectrum, owing to psychoacoustical laws, such components which are not perceived by the listener, i.e. which are irrelevant for communications purposes, can be found more easily in general than in the time range. These components are less weighted or left out entirely in transmission. Through this measure a material part of the otherwise necessary data can be left out so that the average bit rate can be markedly reduced.

It has become apparent that in case of amplitude variations within such a partition or section, particularly in case of signals starting only inside the block out of quietness, these signals are superimposed by disturbances after transmission. The cause for the perceptibility lies in the fact that the disturbances are also present before the signals start and are therefore insufficiently masked.

These disturbances can be generated, for example, by quantization noise which superimposes itself upon the shorttime spectrum and in which also noise parts appear within the whole block in the time range after re-transformation. In order to reduce these disturbances, each block is partitioned in the sub-blocks and the jumps in amplitude of the signals from one sub-block to an adjacent sub-block are detected. In case of amplitude jumps of more than 20 dB, the signals in the preceding block are compressed and, after the re-transformation, expanded.

Here, the following difficulties may arise:
a) The detection of real jumps is uncertain.
b) Only such changes in energy in prior determined sub-blocks which exceed a certain scale are evaluated as jumps.
c) Due to uncertainties in the performed energy detection unintended signal exaggerations may appear in the elevated signal partition.

SUMMARY OF THE INVENTION

It is the object of the invention to improve the above cited method in such a way that in signal changes within a block, as are usual in their variety in natural audio signals, the signal-to-noise ratio after transmission is improved.

The above object is generally achieved according to the present invention by a method for transmitting an audio signal wherein: the audio signal is first partitioned into successive (in time) blocks by means of time windows, the blocks are partitioned into sub-blocks by further time windows, and, in case of level changes from one block to another exceeding a predetermined value, the signals in the sub-blocks are subjected to a compression. Thereafter, the signal parts contained in the blocks are converted from the time range or domain into a short-time frequency spectrum by means of transformation, the short-time frequency spectrums are coded on the basis of psycho-acoustical masking laws, and are transmitted. After transmission, the received coded signals are decoded, the short-time frequency spectrums are coverted back into the time range or domain by means of retransformation, the resulting signal blocks are subjected to an expansion complementary to the compression, and the resulting blocks are assembled. During the compression, the signal parts in the sub-blocks are amplified and/or attenuated dependent on the average signal powers in the respective sub-blocks.

In principle, in every sub-block of the blocks, into which the audio signal is partitioned or sectioned by the time window, a signal compression is carried out. This is no longer made dependent on the fact that real jumps exceed the threshold values. Hereby it is possible to reduce the effects and disturbances during the subsequent processing of the signal, regardless of their origin. By means of complementary expansion of the signals in the blocks after transmission the original signal ratios are regenerated whereby the signal-to-noise ratio is improved compared to weak signals.

BRIEF DESCRIPTION OF THE DRAWINGS

FIG. 13 is a block schematic diagram with processing steps for the side of the transmitter.

FIG. 14 is a block schematic diagram with processing steps for the side of the receiver.

DETAILED DESCRIPTION OF THE PREFERRED EMBODIMENTS

Figure 1:
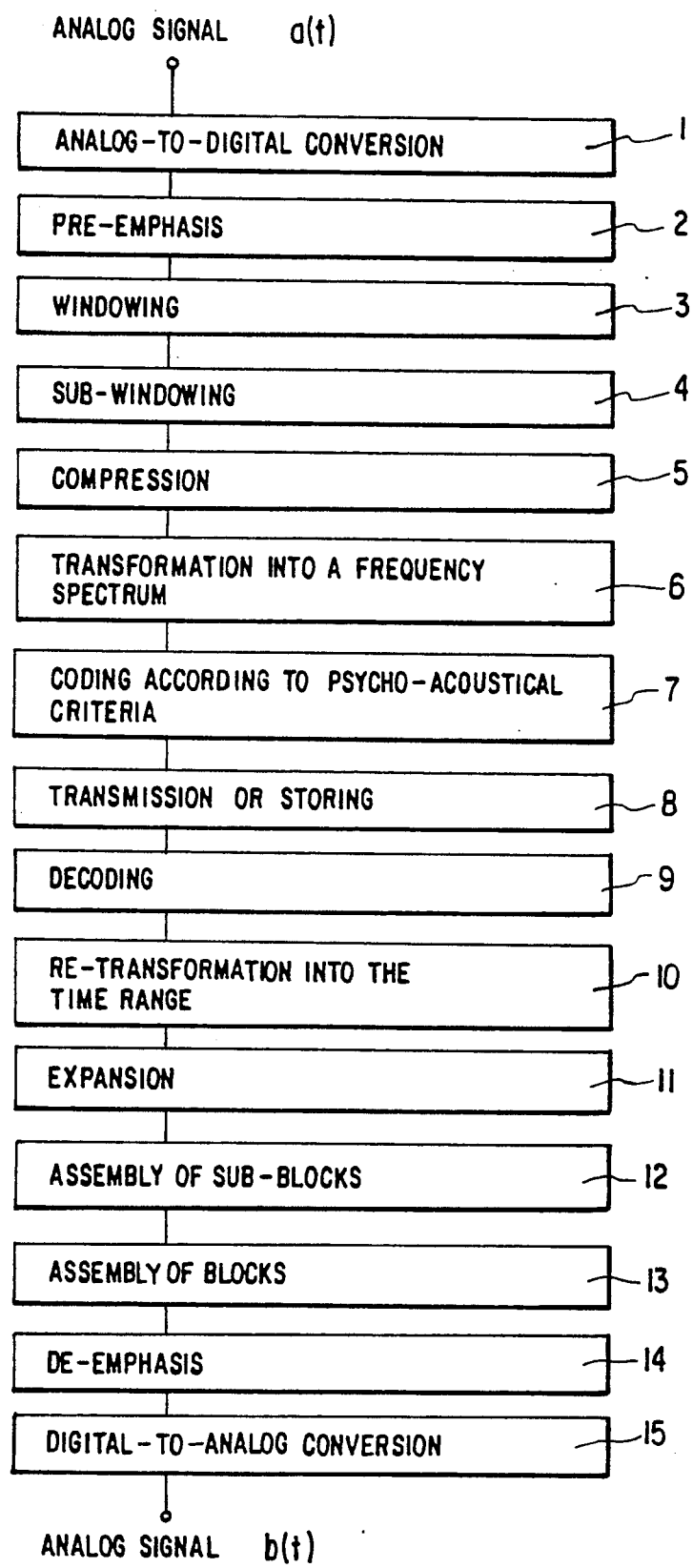
FIG. 1 shows the succession (flow in time) of the method steps according to the invention.

In FIG. 1 the analog signal a (t), which represents an audio signal such as speech or music, is converted to a corresponding digital signal by way of the processing step shown in 1. In the useful, but not absolutely necessary, processing step shown in 2, the signal undergoes a pre emphasis whereby preferably the higher frequency spectral parts of the audio signal are elevated as against the lower frequency parts. Through this measure the effect that signals with low frequencies are poorly masked by signals with high frequencies is to be compensated. In order to nevertheless achieve a masking, the elevation must be performed the higher the farther away the useful frequency is situated.

In the processing step shown in step 3 a windowing of the signal is carried out whereby successive (in time) blocks with signal partitions are created. The duration of these blocks is preferably 20 ms. The signals of one block can later be further processed independently of each other.

In step 4, the blocks are partitioned into sub-blocks by way of weighing by a window function. Useful, here, is a partitioning into between 10 and 20 sub-blocks.

In the subsequent processing step, here shown as 5, the signals are amplified or weakened (attenuated) constantly within the same block whereby, as will be further illustrated below, several processing steps are carried out.

For determination of the amplification factors or weakening (attenuation) factors, the average powers from the signal partitions or sections corresponding to sub-blocks are derived as detection partitions. For the average powers in the detection partitions, then dimension figures or measured values (energy duration of partition) are generated. These dimension figures are referred for the detection partitions of one block to the dimension figure of the detection partition with the highest dimension figure. Then, from the dimension figures, the amplification factors are determined, whereby proportional or quantized amplification factors with different quantization factors can be chosen.

It is useful to choose smaller quantization steps for small amplification factors than for large ones. The maximum amplification factor is preferably limited to a value of 40 dB. Subsequent to the performance of this measure about the same signal-to-noise ratio is achieved for all sub-blocks as regards the useful energy and the disturbance energy created in the course of coding.

In the processing step referred to as 6, subsequently the signal of the block is converted to a frequency spectrum by way of transformation. In step 7 a coding according to psycho-acoustical criteria is carried out. This means that spectral components, which are not perceived anyhow due in particular to masking effects, are weighted less or are left out in the coding. In step 8 the processing step of transmission or storing is represented, whereafter the prior described processing steps in principle are reversed in a backwards order.

Thus, at step 9 a decoding is carried out first by which the transmitted or stored signal is re-converted back into a frequency spectrum. By the processing step referred to as 10 the short time spectrum is again transformed into the time range. In step 11, on the basis of the transmitted amplification factors, the signals present in the blocks and sub-blocks are equalized in a complementary way. In step 12 the sub-blocks are assembled into blocks, and at step 13 a continuing digital signal is created again from the blocks. After performance of a de-emphasis at step 14, which is directed complementary to the preemphasis in step 2, a digital-to-analog conversion is carried out in step 15 after which the analog signal b (t) is finally present. The analog signal b (t) is not identical with the analog signal a (t) because in the coding spectral components are differently weighted or suppressed. The difference between the analog signals b (t) and a (t), however, is of such a nature that it is not recognized by the listener on reproduction.

Figure 2A:
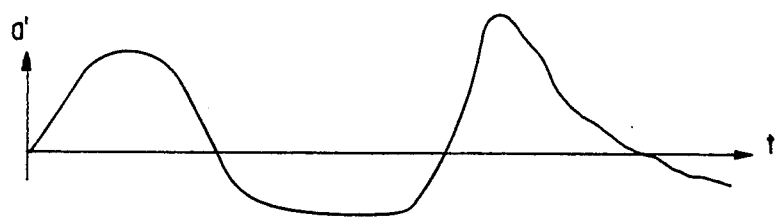
FIGS. 2a–c illustrate a windowing of the signal for obtaining the successive blocks.
Figure 2B:
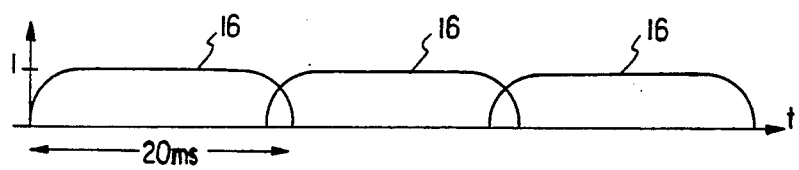
Figure 2C:
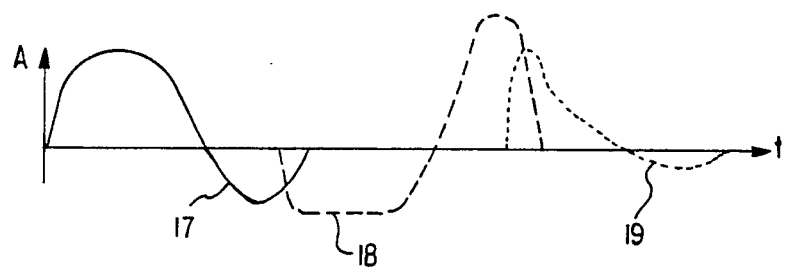

In FIGS. 2 a, b, c, the windowing of the signal a' is shown, as the result of which the successive blocks 17, 18 and 19 are created. This can be achieved in that the signal a' is multiplied with an amplitude characteristic curve 16. The characteristic curve 16, in a preferred example, follows a path which is sinusodial throughout a quarter period at the beginning, then has a constant value and is sinusodial at the end. The steady path at the ends is to avoid a very broad frequency spectrum from being created in the later transformation. Also, the windows are positioned in such a way that the blocks overlap. Subsequently however, for reasons of better presentation, it is assumed that the amplitude paths are square-shaped.

The windows have a duration in time of 20 ms. This time interval has proved to be useful in order, on the one hand, to obtain a sufficiently highly resolved short-time spectrum which contains enough spectral lines in the later coding process to allow an effective data reduction and, on the other hand, to relatively quickly adjust the amplification to the actual changed state in case of changes of the signal and to thereby utilize the psycho-acoustical effect of pre- and after-masking.

Figure 3A:
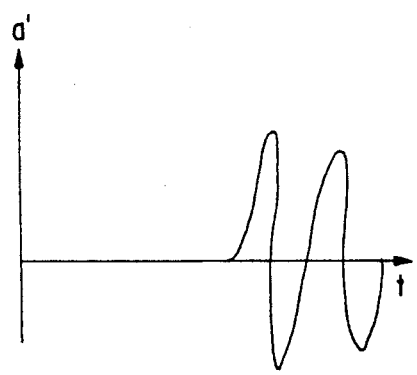
FIG. 3a–d are a representation of a signal starting within a block in the original as well as after re-transformation.
Figure 3B:
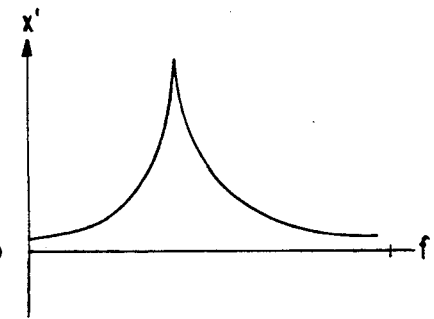
Figure 3D:
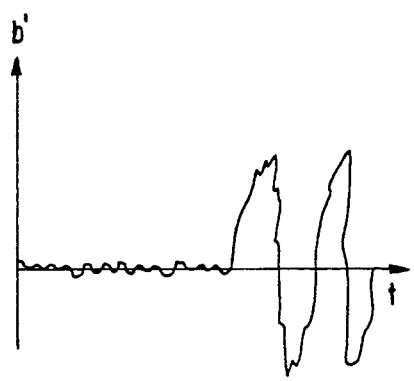
Figure 3C:
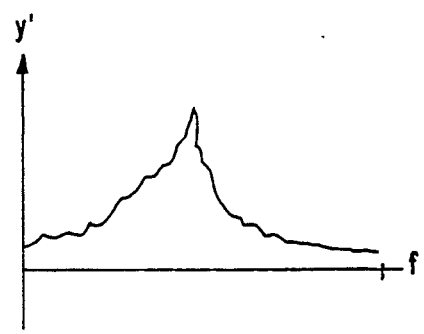

In practice however, there are cases possible in which a signal starts suddenly out of quietness and this start occurs within a block, for example in its second half. This case is represented in FIG. 3a. FIG. 3b shows the transformed signal. Through quantization errors in the coding, the spectrum shown in FIG. 3b is superimposed by a disturbance spectrum so that the spectrum shown in FIG. 3c is generated. As FIG. 3d shows, this disturbance spectrum after re-transformation affects the signal path not only from the start of the signal on but at the beginning of the block already. Because the pre-masking effect is less intensive than the after-masking effect, this disturbance can become audible. By means of corresponding compression within the block before the transformation and transmission, and expansion after the transmission and re-transformation, the signal-to-noise ratio can be markedly improved.

Figure 4:
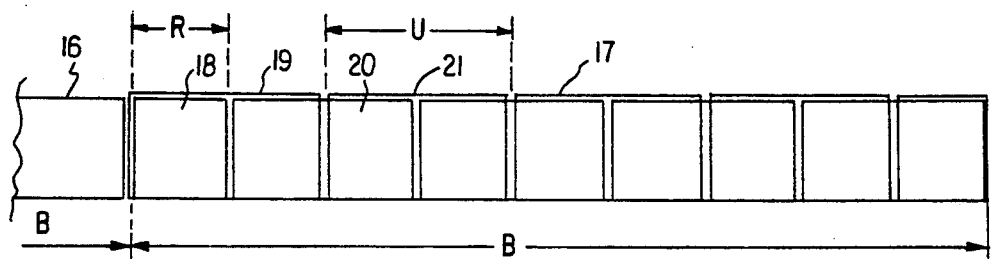
FIG. 4 shows the partitioning into sub-blocks of a signal block.

For this purpose, as shown in FIG. 4, every block 16, 17 ... is partitioned into sub-blocks. These sub-blocks 19, 20, 21 ... have, except at the block edges, identical extensions in time U in that they overlap respectively by half. At the block edges there is an overlap with sub-blocks 18 of half the extension in time R. In these overlapping square-shaped sub-blocks, the average signal powers are determined (energy in the time partition divided by the extension of the time partition).

Figure 5:
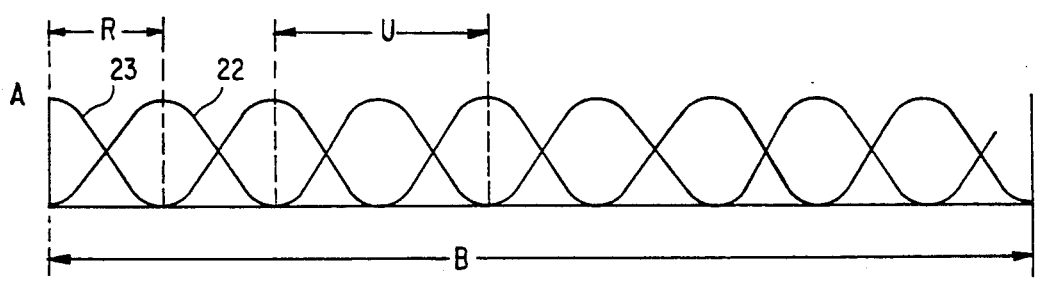
FIG. 5 shows a window function which is superimposed upon the blocks.

In a subsequent step, shown in FIG. 5, the sub-blocks 19, 20, 21 ..., which are square-shaped at first, are evaluated by $COS^2$ (square-cos) window functions 22. The time partitions at the block edges, which are of only half the extension in time of the other sub-blocks, are weighted by a $COS^2$ (square cos) half-window 23. The overlapping weighting functions add u to 1 at each time of the signal block.

Figure 6:
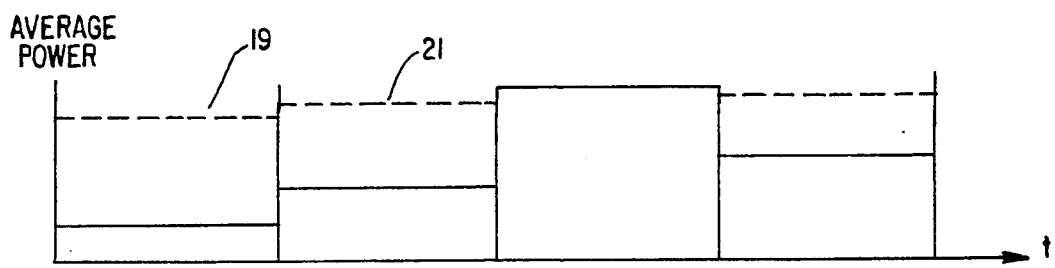
FIG. 6 shows the energy path within a block with and without compression.

FIG. 6 shows how the signals in the sub-blocks 19, 20, 21 corresponding to the detected average powers, here represented by the uninterrupted lines, are amplified or weakened in such a way that the average powers in the sub-blocks 19, 20, 21 ... become about equal, here represented by the interrupted lines. For the purpose of clearer illustration the blocks are here represented by noninterrupted lines. Through the amplification and weakening of the signals, the ratio between the useful block energy and the block disturbance energy created by the coding is not changed. On the other hand, by this measure it is achieved that the same signal-to-noise ratio is now present in all sub-blocks. Thus, with respect to the signal-to-noise ratio the same result is achieved as if one, from the start, had been choosing blocks by windowing which correspond to the size of the sub-blocks. The disadvantages of shorter blocks mentioned above are avoided, however.

The overlapping sub-blocks are for psycho-acoustical reasons preferably designed to have an extension in time of about 2–4 ms. In blocks of about 1000 sampling values with a sampling frequency of 44.1 KHz, this amounts to the creation of about 10–20 sub-blocks. Moreover, it is useful for psycho-acoustical reasons to limit the signal amplification to a maximum value of e.g. 40 dB.

It is sufficient to quantize the amplification factors, whereby the quantization can be carried out comparatively rough, in order to limit the additional data required for the quantization steps. The quantization can be performed in such a way that smaller quantization steps are chosen for smaller amplification factors than for larger ones. Hereby, the quantization is chosen in such amounts that the average power in the elevated sub-block does not exceed the power in the sub-block with the highest detected average power, i.e. the block of reference. In this way it is even possible to achieve a gain in the ratio of useful block energy to block disturbance energy. In this case, the signal-to-noise ratio is not identical in all sub-blocks, however, but only approximately equal.

If only the sub-blocks in which the compression of the signal occurs are weighted by overlapping window functions, but not the sub-blocks which serve for determining the average signal powers for calculation of the amplification factors, in cases of certain signal jumps excessive amplification factors may result.

Figure 7:
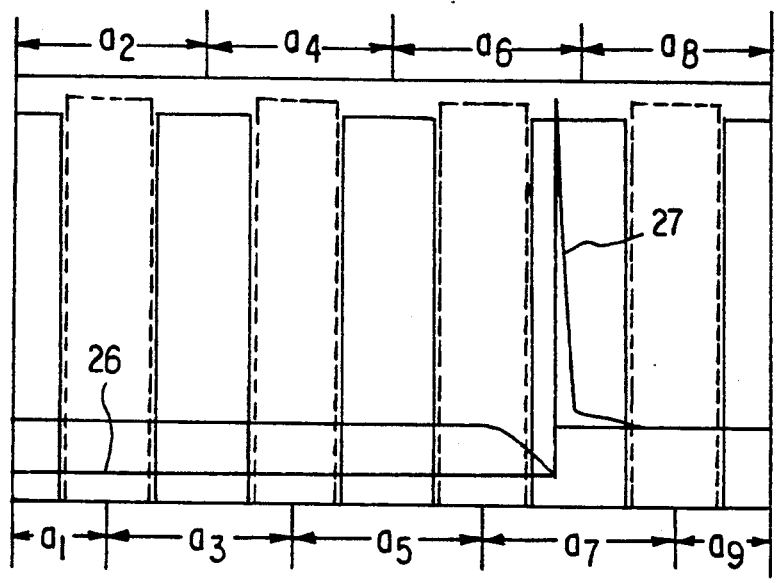
FIG. 7 is a representation of the non-elevated and the elevated signals in a signal jump with non-overlapping windows for calculating the energy of the sub-blocks.

This case is shown in FIG. 7 for an ideal square-shaped jump. The non-elevated signal path is shown as 26, the elevated signal path as 27. The small letters a0 through a8 stand for the elevation factors also called amplification factors. The excess appears when the edge (side) of the jump and the sub-block edge do not correspond.

Figure 8:
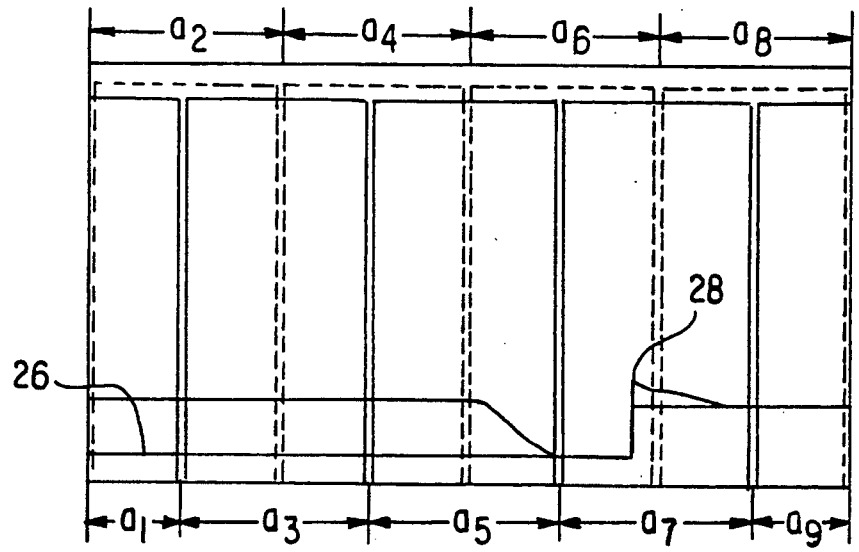
FIG. 8 is a representation, similar to FIG. 7, with 50 per cent overlapping windows, however, for calculating the energy of the sub-blocks.

In order to keep the excess as small as possible, according to a further development, the determination of the average signal powers is also carried out in blocks with 50 per cent overlap, here, however, by square-shaped windows. They directly correspond to the sub-blocks in which the signals are amplified. The result of this measure is shown in FIG. 8 for the same signal jump. The non-elevated signal path is again shown as jump. 26, this time 28 shows the elevated changed signal path.

If the method as described up to now is applied to the complete audio signal, the amplification factors are only correct for the energy intensive spectral parts because these mainly determine the factors. In audio signals it is almost always the spectral parts up to about 3 KHz that are the most energy intensive.

If the method is most precise for the energy intensive spectral parts up to about 3 KHz, signal jumps in higher frequencies with lower energy parts can lead to higher degrees of impreciseness in the coding, which may possibly lead to audible disturbances.

According to a first alternative, the signal can be subjected to a preemphasis before the transmission and coding and to a de-emphasis after the transmission and decoding.

Figure 9:
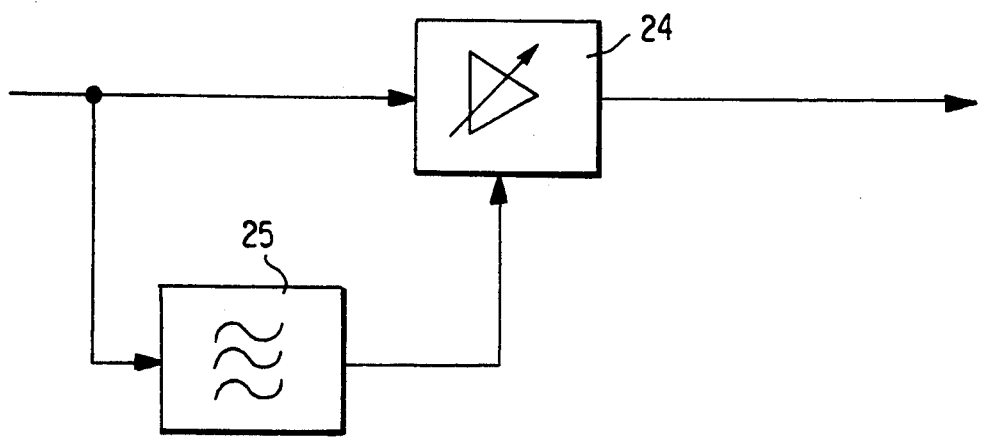
FIGS. 9–11 are block schematic diagrams for carrying out a signal compression or expansion.
Figure 10:
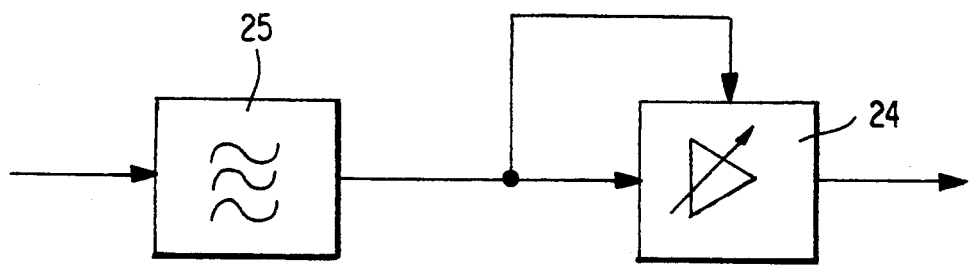
Figure 11:
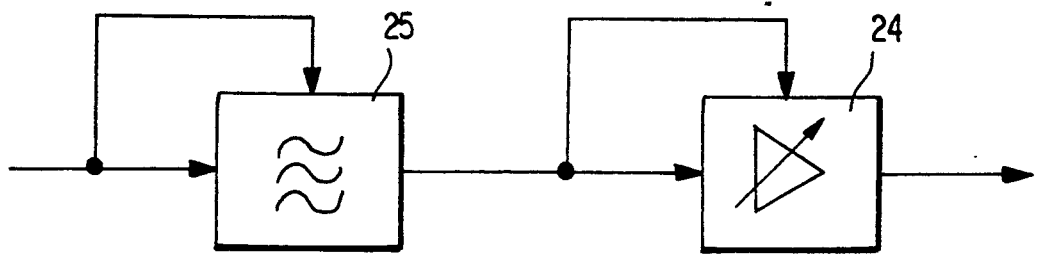

FIG. 9 through 11 show block schematic diagrams for carrying out a compression or, respectively, an expansion together with a preemphasis or, respectively, a de-emphasis. The circuits each comprise a controllable amplifier 24 and a filter 25.

In FIG. 9 only the controllable amplifier 24 is located in the path of the signal. The filter 25 is located in the path of the control signal. If this circuit is used for complementary expansion by means of inverse control the filter 25 can be left out.

In FIG. 10 the filter 25 is connected in series with the controllable amplifier 24. This design requires a filter also for the expansion.

In FIG. 11 the filter 25 is also connected in series with the controllable amplifier 24 and, in addition, designed to be controllable itself. Thereby, the limit frequency can be shifted in such a way that almost always a masking can be achieved. In the expansion the controllable filter 25 as well as the controllable amplifier 24 are to be triggered inversely.

Figure 12:
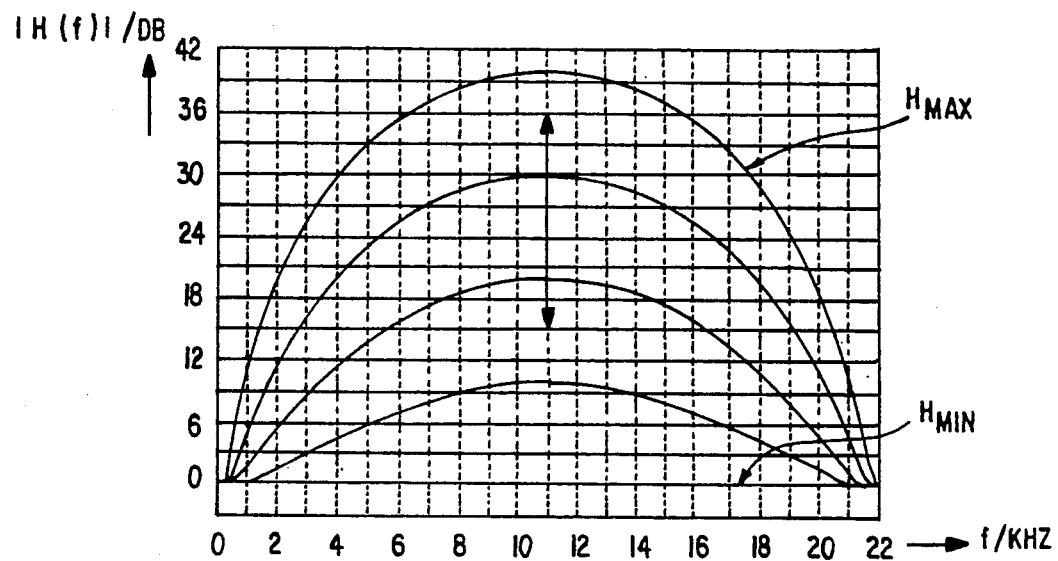
FIG. 12 shows a transmission function of an adaptive filter.

It is a further alternative to carry out a frequency selective signal elevation instead of a fixed pre-emphasis and de-emphasis, whereby an adaptive filter is used. The transmission function of such an adaptive filter for different amplifications is shown in FIG. 12. Thereby, the filter emphasizes only mid-range frequencies and leaves the low as well as the high frequencies unaffected.

The FIGS. 13 and 14 show block schematic diagrams with process steps for performing the process including the adaptive filtering, namely FIG. 13 for the side of the transmitter and FIG. 14 for the side of the receiver.

On the side of the transmitter the input signal is first reduced by means of a fixed band-pass filter 29 to the signal parts which are relevant for determination of the filter coefficient. This band-pass filter 29 should be comparable in its characteristics to the adaptive filter as shown in FIG. 12. The output signal of this band-pass filter 29 at 30 is partitioned, for example, into blocks with preferably 1024 sampling values, whereby the blocks overlap each by 6.25 per cent. The so created blocks correspond in their position in time to the blocks which are later fed to the adaptive filter. As an alternative the fixed band-pass filtering can also be carried out after a respective creation of blocks for a single block. All subsequent processing steps remain unchanged by this.

The filtered signal blocks are partitioned into, for example, 9 sub-blocks by 50 per cent overlapping square-shaped windows in 31. The average signal power from these blocks is determined and the maximum of these signal powers is defined as a reference value. Subsequently, in 32 the elevation factors for each sub-block are calculated which refer to this reference value. Mathematically, the elevation factors are $f_i = P_{Bezug}/P_i$. Hereby, $f_i$ is the factor of the $i^{th}$ block, $P_{Bezug}$ is the reference value and $P_i$ is the average power of the $i^{th}$ block.

Figure 15:
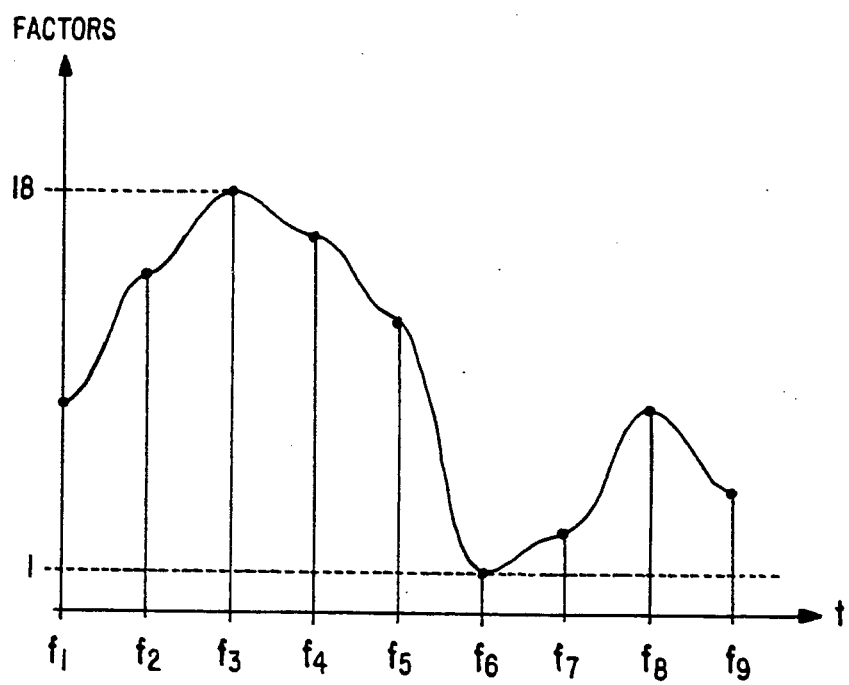
FIG. 15 is a graphic representation of the elevation factors of the sub-blocks of one block.

The factors fi shall apply for the support positions marked by a cross in FIG. 15 and are transmitted to the receiver. For the complete adaptive filtering, in 33 the 9 values present must be extrapolated to 1024 in that the factors fi are softly faded over between the support positions. In an example, the respective factor path for all 1024 sampling values of one block is shown in FIG. 15 by the uninterrupted line, if all factors remain unchanged.

Figure 16:
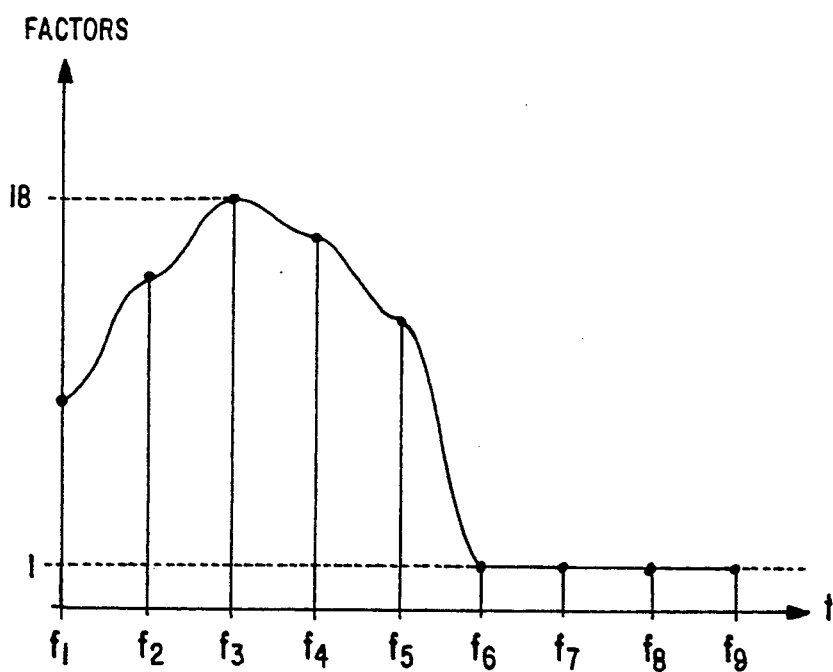
FIG. 16 is a graphic representation, similar to FIG. 15, in which, however, the elevation factors are set to 1 after a signal jump.

Under consideration of psycho-acoustical criteria, however, the factors can be set to 1 after one signal jump, because the effect of the after-masking is better than of the pre-masking. This case is represented in FIG. 16. The fading-over is here carried out by means of a square cosine function.

Figures 17, 18:
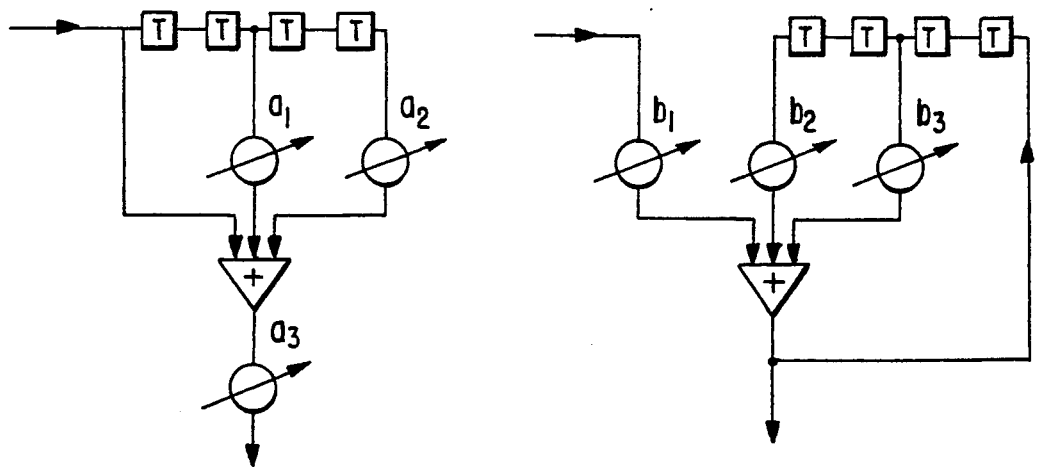
FIG. 17 is a circuit example for an adaptive filter on the side of the transmitter.
FIG. 18 is a circuit example for an adaptive filter on the side of the receiver.

From the here shown factor paths, in 34 for each sampling value the filter coefficients $a_1$ through $a_3$ for an adaptive filter 35, as shown as an example in FIG. 17, can be calculated. An adaptive filter is created, the transient response of which changes with every reading-in of a sampling value. This filter is designed in such a way that it can be variated approximately between the amount functions shown in FIG. 12. Here, the transmission function for the factor 1 is named $H_{min}$ and the transmission function for the maximum admitted factor of preferably 10000 is named $H_{max}$. The so calculated adaptive filter is applied to the unfiltered block in 36 which has been taken out of the continuous signal and has been weighted by the analysis window. Thus, only the signal parts in the mid-range frequency area are elevated, lower frequent and higher frequent signal parts remain unchanged to a large extent. The so filtered block is fed to the coder 37.

The factors $f_i$ can be, for example, quantized logarithmically and transmitted at 5 bits each. In the receiver from this, after a respective extrapolation in 38, subsequently in 39 the 1024 factors are regenerated determining the filter coefficients $b_1$, through $b_3$ for an inverse filter 40 for which an example is shown in FIG. 18. By this filter the block is filtered after the decoding in the receiver in 41 in order to reverse the elevation. Subsequently, the block is weighted by the synthesis window in 42 and a continuous signal is generated by assembling the blocks one after the other.

We claim:

1. In a method for transmitting an audio signal comprising: partitioning the audio signal into successive (in time) blocks by means of time windows; partitioning the blocks into sub-blocks by means of further time window functions; subjecting the signal parts in the respective sub-blocks to a compression if signal level changes from one sub-block to another of a block exceed a predetermined value; thereafter converting all signal parts of the blocks from the time domain into respective short-time frequency spectrums by means of transformation; coding the short-term frequency spectrums on the basis of psycho-acoustical masking laws; transmitting the coded spectrums; receiving and decoding the coded spectrums; subjecting the decoded spectrums to an expansion complementary to the compression; thereafter converting the expanded decoded short-time frequency spectrums back into the time domain by re-transformation; and finally assembling the reconverted blocks in the time domain, the improvement wherein the average signal power in the respective sub-blocks is determined prior to said compression, and during said compression, the signal parts in the sub-blocks are amplified and/or attenuated dependent on the average signal power in the respective sub-blocks.

2. Method according to claim 1, wherein a maximum change of the amplification and/or attenuation is limited.

3. Method according to claim 1, wherein partitioning of the blocks into sub-blocks is performed through weighting by means of window functions which have a constant value throughout a time interval.

4. Method according to claim 3, wherein the window functions overlap and each block is weighted at both its edges by window functions of half the time interval.

5. Method according to claim 4, wherein the blocks are weighted by means of further "soft" window functions which follow a steady path, become zero at the edges of the sub-blocks and complement each other in the whole block resulting in a constant weighting value.

6. Method according to claim 3, wherein the window functions, except at the block edges, are Hanning windows corresponding to $\cos^2$ (square-cos) windows and are $\cos^2$ half-windows at the block edges.

7. Method according to claim 3, wherein the signal parts within the respective sub-blocks are amplified or attenuated with a constant factor.

8. Method according to claim 7, wherein the respective factors are derived from average powers in the signal partition as detection partitions which correspond to sub-blocks.

9. Method according to claim 8, wherein for the average powers in the detection partition, dimension figures (energy divided by duration of partition) are generated.

10. Method according to claim 9, wherein the dimension figures for the detection partitions of one block are referred to the dimension figure of one detection partition with the highest dimension figure to obtain dimension figure ratios, and the obtained dimension figure ratios determined the respective factors.

11. Method according to claim 10, wherein quantized amplification factors are chosen.

12. Method according to claim 11, wherein the quantization is performed irregularly such that for smaller factors smaller quantization steps are used than for larger amplification factors.

13. Method according to claim 1 wherein the amplification factors are limited to a maximum value of 40 dB.

14. Method according to claim 8, wherein the detection partition, like the sub-blocks, are also obtained by weighting of the blocks by means of window functions which have a constant value throughout the time interval.

15. Method according to claim 14, wherein the window functions overlap.

16. Method according to claim 1, wherein the signals are subjected to a pre-emphasis before the generation of the blocks and to a complementary deemphasis after transmission and assembly of the blocks.

17. Method according to claim 16, wherein the pre-emphasis elevates higher frequency spectral parts of the audio signal as against lower frequency parts.

18. Method according to claim 1, wherein the signals used to determine the average signal powers in the sub-blocks are filtered dependent on frequency, preferably by means of a band-pass filter, and that the compression and expansion are also performed in a frequency dependent way.

19. Method according to claim 18, wherein from the signals used to determine the average signal powers in the sub-blocks, dimension figures are obtained for changing an adaptive band-pass filter, by means of which the compression and expansion is performed.

20. Method according to claim 19, wherein the adaptive band-pass filter is designed as a transversal filter with three coefficients.

21. Method according o claim 19, wherein from the dimension figures, which are at first, for each sub-block, referred to the subblock with the highest signal power, for each sampling value in the sub-blocks intermediate values are extrapolated according to an extrapolation rule and the adaptive filter for each sampling value is changed according to extrapolated intermediate values.

22. Method according to claim 21, wherein in the sub-blocks which follow after the sub-block with the highest signal power, the dimension figures are set equal to a reference value of this sub-block with the highest signal power, so tat in these sub-blocks changes of the adaptive filter dependent on the sampling values are no longer carried out.

23. Method according to claim 21, wherein only those dimension figures which correspond to the number of sub-blocks and serve as supporting values are transmitted and, if applicable, the extrapolation rule is transmitted in addition and that on the side of the receiver the extrapolated intermediate values are reconstructed and inverted in order to perform the expansion.

* * * * *